United States Patent
Kanamarlapudi et al.

(10) Patent No.: US 11,924,795 B2
(45) Date of Patent: Mar. 5, 2024

(54) ETHERNET PROTOCOL DATA UNIT (PDU) SESSION—HYPER FRAME NUMBER (HFN) RESYNC

(71) Applicant: QUALCOMM Incorporated, San Diego, CA (US)

(72) Inventors: Sitaramanjaneyulu Kanamarlapudi, San Diego, CA (US); Arun Prasanth Balasubramanian, San Diego, CA (US); Feilu Liu, San Diego, CA (US); Suli Zhao, San Diego, CA (US); Vaibhav Kumar, Encinitas, CA (US); Dan Gilboa Waizman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/538,756

(22) Filed: Nov. 30, 2021

(65) Prior Publication Data
US 2023/0171727 A1    Jun. 1, 2023

(51) Int. Cl.
*H04W 56/00*   (2009.01)
*H04L 69/22*   (2022.01)
(Continued)

(52) U.S. Cl.
CPC ......... *H04W 56/0055* (2013.01); *H04L 69/22* (2013.01); *H04W 56/001* (2013.01); *H04W 76/19* (2018.02); *H04W 80/02* (2013.01)

(58) Field of Classification Search
CPC ........... H04W 56/0055; H04W 56/001; H04W 76/19; H04W 80/02; H04L 69/22; G01V 2210/6169; G01V 1/282; G01V 1/50
See application file for complete search history.

(56) References Cited

U.S. PATENT DOCUMENTS

| | | | |
|---|---|---|---|
| 2017/0063491 A1* | 3/2017 | Bruckman | H04L 25/4908 |
| 2020/0252889 A1* | 8/2020 | Anand | H04W 92/10 |
| 2022/0167408 A1* | 5/2022 | Lee | H04W 74/0808 |

FOREIGN PATENT DOCUMENTS

| | | | |
|---|---|---|---|
| EP | 2785091 A1 | 10/2014 | |
| WO | WO-2009022803 A1 * | 2/2009 | G06F 11/1004 |

OTHER PUBLICATIONS

International Search Report and Written Opinion—PCT/US2022/078784—ISA/EPO—dated Feb. 17, 2023.
(Continued)

*Primary Examiner* — Lakeram Jangbahadur
(74) *Attorney, Agent, or Firm* — Norton Rose Fulbright US LLP

(57) ABSTRACT

Systems, methods, and devices for wireless communication that support mechanisms for identifying hyper frame number (HFN) desynchronization conditions and/or for triggering HFN resynchronization in a wireless communication system. In aspects, an HFN desynchronization condition is identified based on Ethernet frame validation. For example, aspects of the present disclosure provide mechanisms for validating and Ethernet frame. An HFN desynchronization condition is identified or detected when an Ethernet frame is determined to be corrupt based on the Ethernet frame validation in accordance with aspects herein. In some aspects, such as in Ethernet header compression (EHC) protocol implementations, an HFN desynchronization condition may be identified based on a determination that a deciphered context identification (CID) is not a valid CID (e.g., is not a CID in a set of valid CIDs).

30 Claims, 8 Drawing Sheets

(51) Int. Cl.
*H04W 76/19* (2018.01)
*H04W 80/02* (2009.01)

(56) References Cited

OTHER PUBLICATIONS

LG Electronics Inc: "Discussion on Performing ROHC and Ehc", 3GPP TSG-RAN WG2 Meeting #109-e, R2-2001502, 3rd Generation Partnership Project, Mobile Competence Centre, 650, Route Des Lucioles, F-06921 Sophia-Antipolis Cedex, France, vol. RAN WG2, No. Online, Feb. 24, 2020-Mar. 6, 2020, Feb. 14, 2020, XP051849801, 9 pages.

* cited by examiner

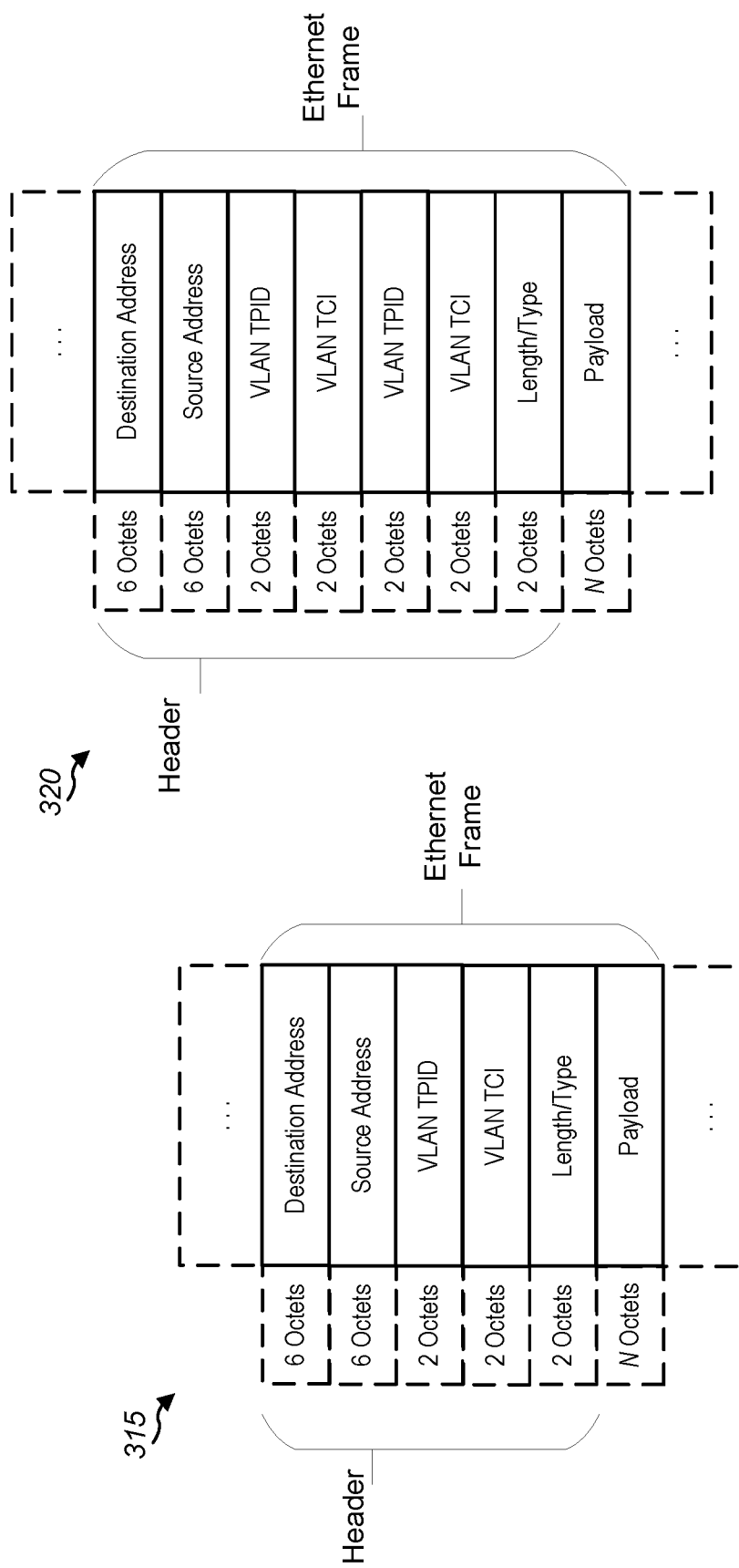

ETHERNET PROTOCOL DATA UNIT (PDU) SESSION—HYPER FRAME NUMBER (HFN) RESYNC

TECHNICAL FIELD

Aspects of the present disclosure relate generally to wireless communication systems, and more particularly, to hyper frame number (HFN) synchronization failure detection and HFN resynchronization mechanisms.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a first network entity includes receiving, from a second network entity, an Ethernet frame over a wireless link, the Ethernet frame including an Ethernet header and an Ethernet payload, and determining, based, at least in part, on the Ethernet header of the Ethernet frame, whether a hyper frame number (HFN) synchronization failure in a current communication session between the first network entity and the second network entity has occurred. In aspects, a current HFN at the first network entity and a current HFN at the second network entity are not synchronized to each other when the synchronization failure in the current communication session has occurred. The method further includes performing, in response to a determination that the HFN synchronization failure has occurred, a resynchronization procedure to synchronize the current HFN at the first network entity to the current HFN at the second network entity. In aspects, the first network entity may be a user equipment (UE) and the second network entity may be a base station, the first network entity may be a base station and the second network entity may be a UE, or the first network entity may be a UE and the second network entity may another UE.

In an additional aspect of the disclosure, an apparatus configured for wireless communication includes at least one processor and a memory coupled to the at least one processor. The memory stores processor-readable code that, when executed by the at least one processor, is configured to perform operations including receiving, from a second network entity, an Ethernet frame over a wireless link, the Ethernet frame including an Ethernet header and an Ethernet payload, and determining, based, at least in part, on the Ethernet header of the Ethernet frame, whether an HFN synchronization failure in a current communication session between the first network entity and the second network entity has occurred. In aspects, a current HFN at the first network entity and a current HFN at the second network entity are not synchronized to each other when the synchronization failure in the current communication session has occurred. The operations further include performing, in response to a determination that the HFN synchronization failure has occurred, a resynchronization procedure to synchronize the current HFN at the first network entity to the current HFN at the second network entity. In aspects, the first network entity may be a UE and the second network entity may be a base station, the first network entity may be a base station and the second network entity may be a UE, or the first network entity may be a UE and the second network entity may another UE.

In an additional aspect of the disclosure, a non-transitory computer-readable medium stores instructions that, when executed by a processor, cause the processor to perform operations. The operations include receiving, from a second network entity, an Ethernet frame over a wireless link, the Ethernet frame including an Ethernet header and an Ethernet payload, and determining, based, at least in part, on the Ethernet header of the Ethernet frame, whether an HFN synchronization failure in a current communication session between the first network entity and the second network entity has occurred. In aspects, a current HFN at the first network entity and a current HFN at the second network entity are not synchronized to each other when the synchronization failure in the current communication session has occurred. The operations further include performing, in response to a determination that the HFN synchronization failure has occurred, a resynchronization procedure to synchronize the current HFN at the first network entity to the current HFN at the second network entity. In aspects, the first network entity may be a UE and the second network entity may be a base station, the first network entity may be a base station and the second network entity may be a UE, or the first network entity may be a UE and the second network entity may another UE.

In an additional aspect of the disclosure, an apparatus includes means for receiving, from a second network entity, an Ethernet frame over a wireless link, the Ethernet frame including an Ethernet header and an Ethernet payload, and means for determining, based, at least in part, on the Ethernet header of the Ethernet frame, whether an HFN synchronization failure in a current communication session between the first network entity and the second network entity has occurred. In aspects, a current HFN at the first network entity and a current HFN at the second network entity are not synchronized to each other when the synchronization failure in the current communication session has occurred. The apparatus further includes means for performing, in response to a determination that the HFN synchronization failure has occurred, a resynchronization procedure to synchronize the current HFN at the first network entity to the current HFN at the second network entity. In aspects, the first network entity may be a UE and the second network entity may be a base station, the first network entity may be a base station and the second network entity may be a UE, or the first network entity may be a UE and the second network entity may another UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3B is a block diagram illustrating an example of a single-tagged Ethernet frame.

FIG. 3C is a block diagram illustrating an example of a double-tagged Ethernet frame.

Like reference numbers and designations in the various drawings indicate like elements.

DETAILED DESCRIPTION

Figure 1:
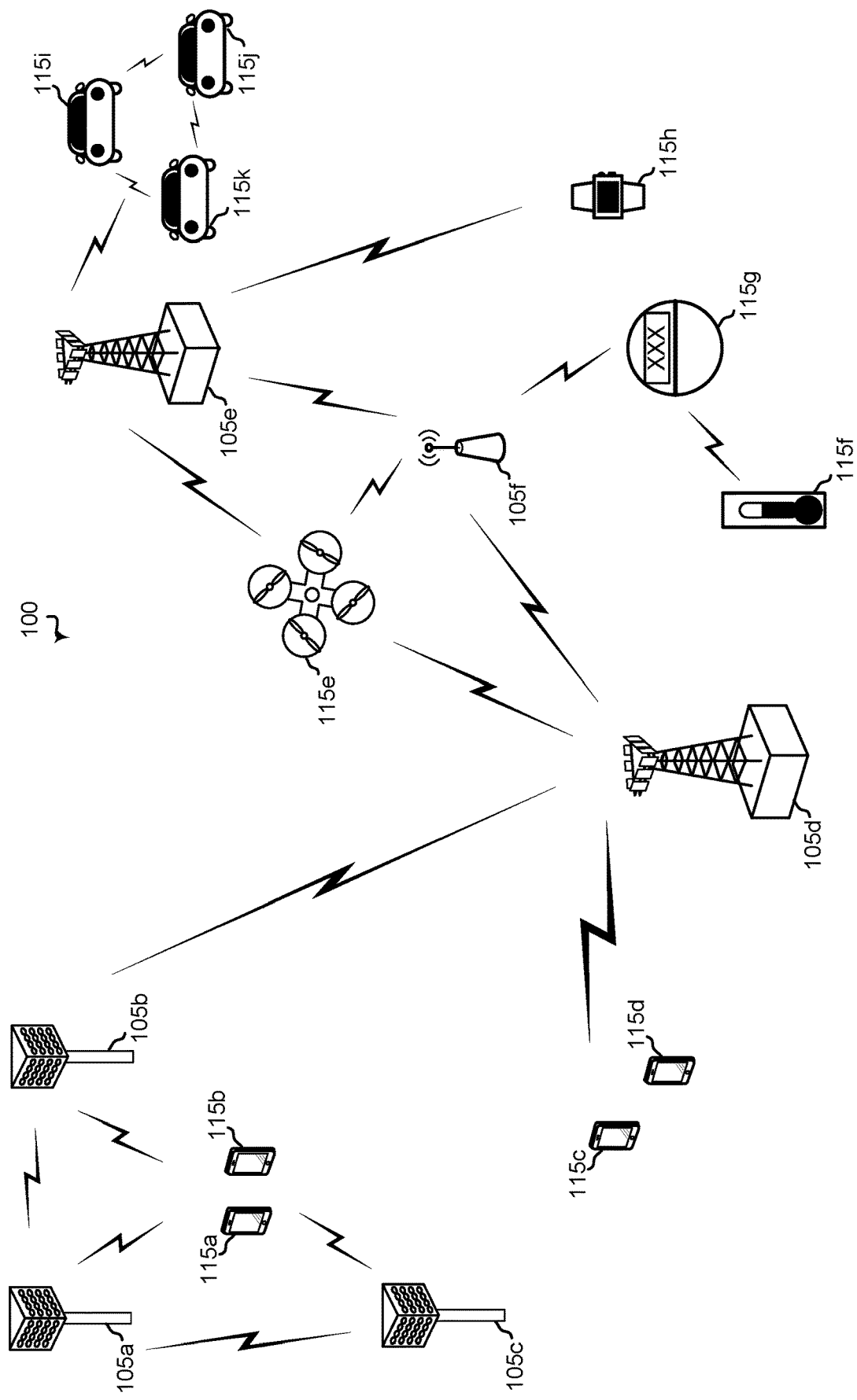
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation NB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, or backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
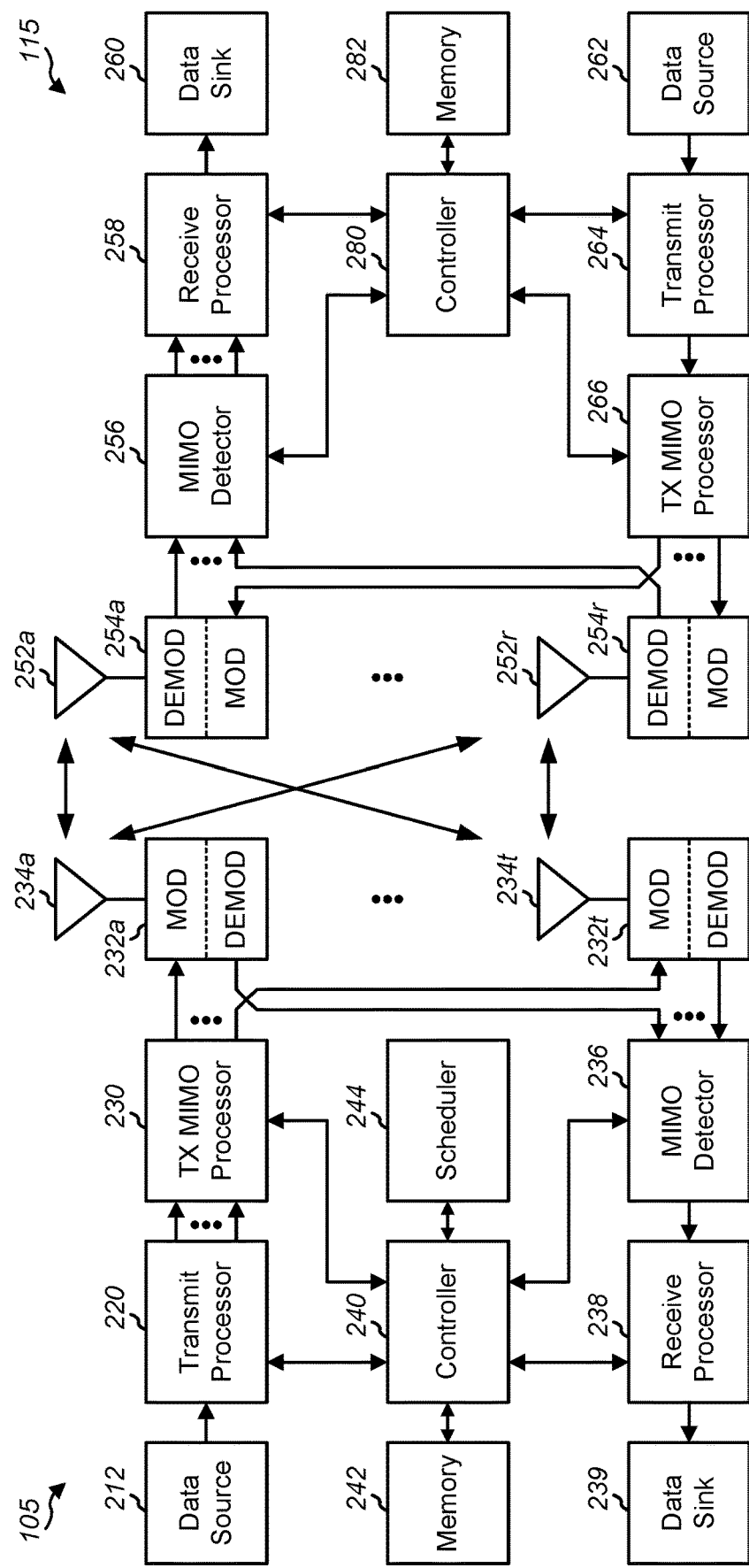
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current wireless communication systems, Ethernet communication may involve transmission and reception of information in data units (e.g., protocol data unit (PDU)) referred to as Ethernet frames (also referred to as Ethernet packets). Ethernet frames may have different formats, and the Ethernet frame types may be differentiated based on a "Length/Type" field, which is typically 2 octets in length, included in the header of the Ethernet frame. When the Length/Type field carries a value that is less than or equal to 1500 decimal, then the value carried in the Length/Type field is determined to indicate a length of the Ethernet frame payload. On the other hand, when Length/Type field carries a value that is greater than or equal to 1536 decimal, then the value of carried in the Length/Type field is determined to indicate the Ethertype of the Ethernet frame payload, rather than the length of the Ethernet frame payload. In implementations, the Ethertype may be internet protocol version 4 (IPv4), IPv6, or a vendor-specific format.

In implementations, there may be two main types of Ethernet frames, untagged Ethernet frames and tagged Ethernet frames. Untagged Ethernet frames may include frames that do not carry a tag (e.g., a virtual local area network (VLAN) tag). For example, in untagged Ethernet frames, a value in the Length/Type field of the header of the Ethernet frame does not indicate or correspond to a VLAN tag. In implementation, the format of untagged Ethernet frames may be defined by current standards (e.g., IEEE standards). For example, a basic untagged frame may be one in which the Length/Type field carries a value that is less than or equal to 1500 decimal, in which case, as noted above, the value carried in the Length/Type field indicates a length of the Ethernet frame payload rather than indicating a VLAN tag. Another type of untagged Ethernet frame is the untagged envelop frame (also referred to as an Ethernet type II frame). In an untagged envelop frame, the value carried in the Length/Type field is greater than or equal to 1536 decimal, but the Length/Type field value does not correspond to any defined VLAN tag IDs.

Figure 3A:
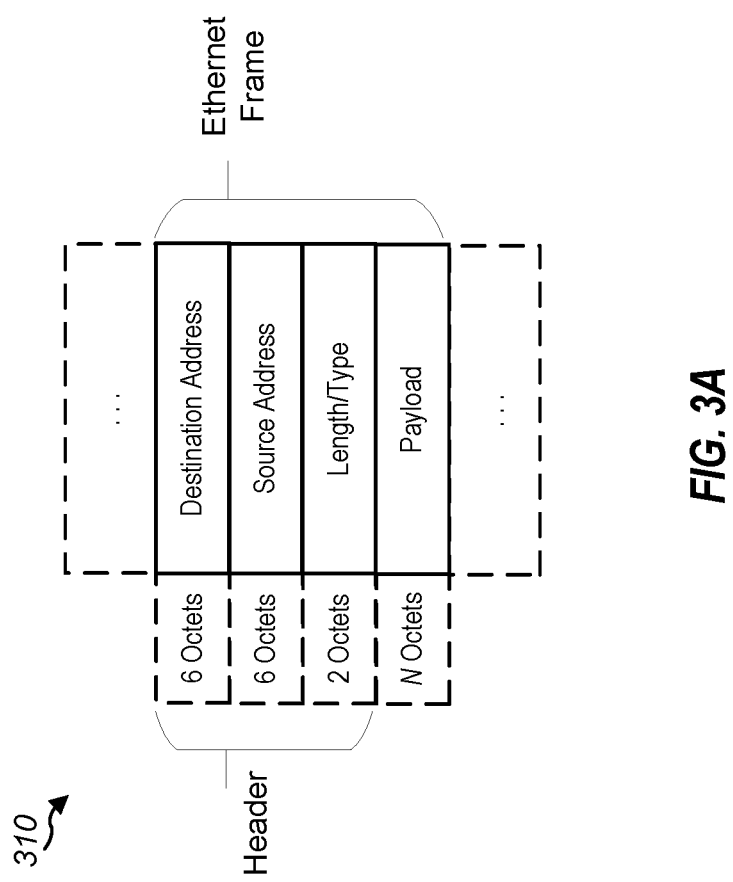
FIG. 3A is a block diagram illustrating an example of an untagged Ethernet frame.

FIG. 3A is a block diagram illustrating an example of an untagged Ethernet frame. In the example illustrated in FIG. 3A, Ethernet frame 310 may include various fields. For example, Ethernet frame 310 may include an Ethernet header and an Ethernet payload. In aspects, the header of Ethernet frame 310 may include a field, typically 6 octets in length, for specifying a destination address of the Ethernet frame, a field, typically 6 octets in length, for specifying a source address of the Ethernet frame, and a Length/Type field, typically 2 octets in length, for specifying the length of the Ethernet payload or the Ethertype of the Ethernet payload depending on the value as described above. The Ethernet payload field may include an Ethernet payload of N octets. In some implementations, an untagged Ethernet frame, including the Ethernet header, may be configured to have a minimum length of 64 octets for any frame type, a maximum length of 1518 octets for a basic untagged frame, and a maximum length of 2000 octets for an untagged envelop frame. In some implementations, Ethernet frame padding may also be transmitted over the 5G NR link interface over which the Ethernet frame may be transmitted.

Tagged Ethernet frames may include Ethernet frames carrying at least one VLAN tag. For example, single-tagged frames may include Ethernet frames having a format in which a single tag (e.g., a VLAN tag) may be included in the header of the Ethernet frame (e.g., in a Length/Type field of the Ethernet header). For example, FIG. 3B is a block diagram illustrating an example of a single-tagged Ethernet frame. As shown in the example illustrated in FIG. 3B, single-tagged Ethernet frame 315 may carry various fields, including a destination address, a source address, a Length/Type field, as described above with respect to untagged frames, but single-tagged Ethernet frame 315 may also carry a single VLAN tag. In implementations, the VLAN tag may comprise a VLAN tag protocol ID (TPID), which may typically have a length of 2 octets, and a VLAN tag control information (TCI) field, which may typically have a length of 2 octets. These four octets of the VLAN tag may be inserted between the source address field and the Length/Type field of the header of Ethernet frame 315.

Double-tagged frames may include Ethernet frames having a format in which two tags (e.g., two VLAN tags) may be included in the header of the Ethernet frame (e.g., in a Length/Type field of the Ethernet header. For example, FIG. 3C is a block diagram illustrating an example of a double-tagged Ethernet frame. As shown in the example illustrated in FIG. 3C, double-tagged Ethernet frame 320 may carry two four-octets VLAN tags, each VLAN tag including a two-octet VLAN TPID and a two-octet VLAN TCI, inserted between the source address field and the Length/Type field of the header of Ethernet frame 320.

In some implementations, some Ethernet frames may have a format in which more than two tags (e.g., more than two VLAN tags) may be included in the header of the Ethernet frame. In these implementations, the two or more VLAN tags may be inserted between the source address field and the Length/Type field of the header of the Ethernet frame.

It is noted that, VLAN tags have a predefined VLAN TPID. In this manner, a node may identify a value in a Length/Type field as a VLAN tag ID by comparing the value in the Length/Type field to the predefined VLAN tag IDs. When the value in the Length/Type field corresponds to VLAN tag ID, then the value in the Length/Type field is determined to indicate a VLAN TPID, instead of an Ethertype.

In implementations, an encryption scheme in which data may be encrypted at the packet data convergence protocol (PDCP) layer may be used. In these implementations, a PDCP COUNT value may be used as one of several ciphering and/or deciphering keys used to encrypt and/or decrypt the data. In implementations, the PDCP COUNT value may be maintained per dedicated radio bearer (DRB) and may be incremented by one for each transferred PDCP protocol data unit (PDU) in the DRB. In this manner, a transmitter may encrypt a PDCP PDU based, at least in part, on the PDCP COUNT value maintained at the transmitter, and a receiving the PDCP PDU may decipher the PDCP PDU based on the PDCP COUNT value maintained at the receiver. If the PDCP COUNT value at the receiver is the same as the PDCP COUNT value at the transmitter, the deciphering at the receiver may be performed accurately. Otherwise, if the PDCP COUNT value at the receiver is not the same as the PDCP COUNT value, the deciphering of the PDCP PDU at the receiver may fail. In implementations, the PDCP COUNT value may be composed of a hyper frame number (HFN) and a PDCP sequence number (SN), concatenated together. The SN may be included in every PDCP data PDU header, whereas the HFN may not be transmitted to the receiver or transmitter. The SN is increased for every PDCP data PDU, and when the SN reaches a maximum value, the SN wraps around back to zero. Typically, the receiver and the transmitter have the same initial HFN value, and the HFN may be incremented by one every time the SN wraps around to zero. The receiver adjusts the HFN value for each transferred PDCP data PDU, such that the receiver uses the same HFN value as the transmitter for every PDCP data PDU.

As the PDCP COUNT value used for PDCP deciphering is based on the HFN value, when the HFN is desynchronized between the transmitter and the receiver (e.g., when the HFN used by the transmitter is not the same as used by the receiver), the PDCP deciphering will result in corrupted Ethernet frames, as the PDCP COUNT value may not be synchronized between transmitter and receiver. Therefore, an HFN desynchronization condition may result in corrupted Ethernet frames. In this manner, identifying a corrupt Ethernet frame may also serve to identify that the HFN between the transmitter and the receiver is desynchronized.

Current wireless communication systems may implement an Ethernet header compression (EHC) protocol. For example, as described above, an Ethernet frame may include an Ethernet header and/or an Ethernet payload. As also described above (e.g., with reference to FIGS. 3A-3C), a header of an Ethernet frame may include parameters (e.g., values in corresponding fields of the Ethernet header) that may not vary over a PDU session, as opposed to parameters in an TCP/IP packets (e.g., sequence number, etc.). For example, except for VLAN tags, a header of an Ethernet frames within a PDU session does not have variable parameters. EHC implementations take advantage of the constancy of an Ethernet header (e.g., a header of an Ethernet frame) and provides a mechanism for replacing and Ethernet header with a much smaller context ID (CID) (e.g., up to two bytes).

Typically, an EHC compressor (e.g., a transmitting node) and an EHC decompressor (e.g., a receiving node) may store original header field information as an EHC context for an Ethernet PDU session. For example, in some implementations, the EHC protocol may be configured to compress the destination address field, the source address field, the VLAN tag field, and the Length/Type field. As noted above, there may be more than one VLAN tag fields, and in these cases, all VLAN tags are compressed by the EHC protocol. In these cases, the decompressor and the compressor may store the information in these fields as EHC context. The EHC context must be synchronized between the EHC compressor and the EHC decompressor, or the EHC decompressor may erroneously decompresses the compressed header packets.

In accordance with the EHC protocol, a transmitting node (e.g., a compressor) may associate the EHC context with a CID. The compressor may then transmit a full header packet to a receiving node (e.g., a decompressor) including a full header with the information in the EHC context without compression, along with the CID associated with the EHC context. The compressor may continue transmitting full header packets until receiving an EHC feedback message from the decompressor. For example, the decompressor may successfully receive the full header packet, including the full header and the associated CID, and may establish an EHC context based on the full header information. The decompressor may then transmit the EHC feedback message indicating to the compressor that the EHC context identified by the CID has been established. After receiving the EHC feedback message, the compressor may, from then on, transmit compressed header packets to the decompressor instead of the full header packets. The compressed header packet may comprise the CID, instead of the full header. The decompressor may receive the compressed header packet and may restore the original header fields based on the stored EHC context identified by the associated CID in the compressed header packet.

However, during operations, and especially during dynamic radio conditions, the receiving node (e.g., the decompressor) often runs into decompression failures either due to desynchronization of ciphering parameters, or due to a high packet block error rate (BLER). For example, when an HFN desynchronization condition occurs, the Ethernet header, which may be used to establish the EHC context to which the CID may be tied, may be corrupted, which in turn may cause EHC decompression failures. In another example, an HFN desynchronization condition may cause the CID information to be incorrectly deciphered. In this manner, identifying an invalid CID after deciphering a compressed Ethernet frame may also serve to identify that the HFN between the compressor and the decompressor is desynchronized.

Various aspects of the present disclosure are directed to systems and methods that support mechanisms for identifying HFN desynchronization conditions and/or for triggering HFN resynchronization in a wireless communication system. In aspects, an HFN desynchronization condition may be identified based on Ethernet frame validation. For example, aspects of the present disclosure provide mechanisms for validating and Ethernet frame. An HFN desynchronization condition may be identified or detected when an Ethernet frame is determined to be corrupt based on the Ethernet frame validation in accordance with aspects herein. In some aspects, such as in EHC implementations, an HFN desynchronization condition may be identified based on a determination that a deciphered CID is not a valid CID (e.g., is not a CID in a set of valid CID).

In aspects, triggering HFN resynchronization may include transmitting an HFN resynchronization signal. For example, a base station may transmit, in response to a determination that an HFN desynchronization condition exists, an HFN resynchronization signal to a UE. The UE may perform an HFN resynchronization procedure in response to receiving the HFN resynchronization signal. In some aspects, the UE may perform the HFN resynchronization procedure in response to a determination that an HFN desynchronization condition exists, without receiving the HFN resynchronization signal from the base station. In aspects, the HFN resynchronization procedure may include attempting to decipher the received Ethernet frame (e.g., the Ethernet frame or the compressed header Ethernet frame) using different HFN values centered around a current HFN value of the corrupted Ethernet frame or invalid CID.

Figure 4:
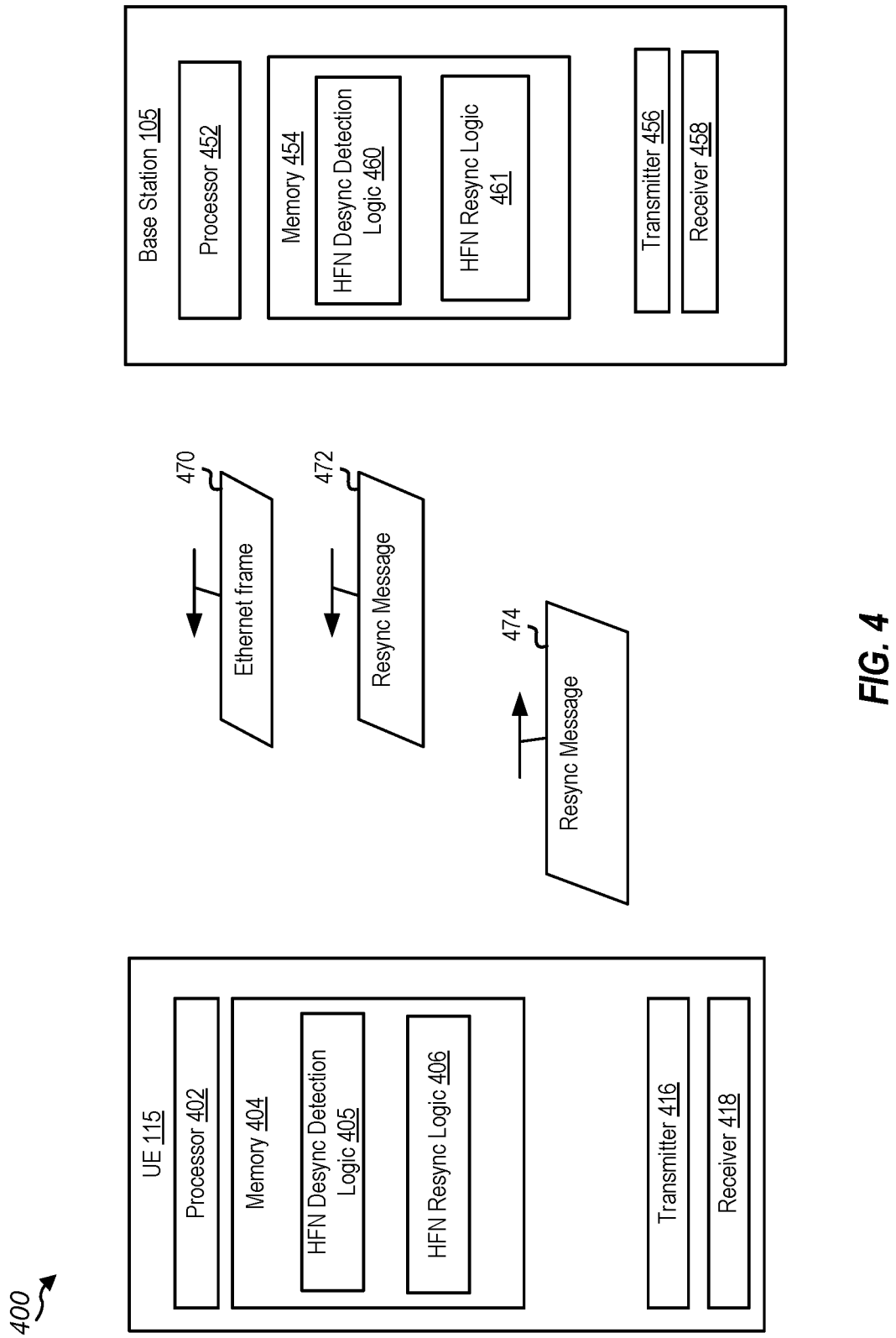
FIG. 4 is a block diagram illustrating an example wireless communication system that supports mechanisms for identifying hyper frame number (HFN) desynchronization conditions and/or for triggering HFN resynchronization in a wireless communication system according to one or more aspects.

FIG. 4 is a block diagram of an example wireless communications system 400 that supports mechanisms for identifying HFN desynchronization conditions and/or for triggering HFN resynchronization in a wireless communication system according to one or more aspects. In some examples, wireless communications system 400 may implement aspects of wireless network 100. Wireless communications system 400 includes UE 115 and base station 105. Although one UE 115 and one base station 105 are illustrated, in some other implementations, wireless communications system 400 may generally include multiple UEs 115, and may include more than one base station 105.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), one or more receivers 418 (hereinafter referred to collectively as "receiver 418"), and one or more antenna modules 406 (hereinafter referred to collectively as "antenna module 406"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store HFN desynchronization detection logic 405, and HFN resynchronization logic 406. In aspects, HFN desynchronization detection logic 405 is configured to perform operations for detecting an HFN desynchronization condition in accordance with aspects of the present disclosure. HFN resynchronization logic 406 is configured to perform operations for triggering an HFN resynchronization, which may include transmitting (e.g., to base station 105) an indication that an HFN desynchronization condition has occurred and/or performing an HFN resynchronization procedure, in accordance with aspects of the present disclosure.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store HFN desynchronization detection logic 460, and HFN resynchronization logic 461. In aspects, HFN desynchronization detection logic 460 is configured to perform operations for detecting an HFN desynchronization condition in accordance with aspects of the present disclosure. HFN resynchronization logic 461 is configured to perform operations for triggering an HFN resynchronization, which may include transmitting (e.g., to UE 115) an indication that an HFN desynchronization condition has occurred and/or performing an HFN resynchronization procedure, in accordance with aspects of the present disclosure.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

It is noted that in the discussion that follows, base station 105 is described as a transmitting node and UE 115 is described as a receiving node. In this context, base station 105 may transmit Ethernet frames to UE 115, and UE 115 may validate the Ethernet frames to determine whether an HFN desynchronization condition exists or not. However, this is merely for illustrative purposes and should not be construed as limiting in any way. In some aspects, the techniques described herein may be used where UE 115 is a transmitting node and base station 105 is a receiving node. Additionally, UE 115 may be described as a decompressor and base station 105 may be described as a compressor, but this is merely for illustrative purposes and should not be construed as limiting in any way. In some aspects, the techniques described herein may be used where UE 115 is the compressor and base station 105 is the decompressor. Additionally, in some aspects, the techniques described herein may be used where UE 115 is a transmitting node and another UE is a receiving node, and/or where the another UE is a transmitting node and UE 115 is a receiving node. Additionally still, the techniques described herein may be used where UE 115 is a compressor and the another UE is a decompressor, and/or where the another UE is a compressor and UE 115 is a decompressor.

During operation of wireless communications system 400, base station 105 transmits a data packet to UE 115 as part of a current Ethernet communication session (e.g., an Ethernet PDU session). In aspects, the data packet may be an Ethernet packet including Ethernet frame 470 transmitted in a DRB associated with the Ethernet PDU session. Ethernet frame 470 may be an Ethernet frame of any of the types described above (e.g., with respect to FIGS. 3A-3C). Ethernet frame 470 may include an Ethernet header and an Ethernet payload, and the Ethernet header may include a destination address field, a source address field, one or more VLAN tags, and/or a Length/Type field, as described above. In aspects, base station 105 may, prior to transmitting Ethernet frame 105 to UE 115, perform encoding or ciphering of Ethernet frame 470 based, at least in part, on an HFN value maintained by base station 105 (e.g., an HFN value that is part of a PDCP COUNT value maintained by base station 105).

In aspects, UE 115 receives Ethernet frame 470 and performs deciphering of Ethernet frame 470. UE 115 may decipher Ethernet frame 470 based, at least in part, on an HFN value maintained by UE 115 (e.g., an HFN value that is part of a PDCP COUNT value maintained by UE 115).

During operations of wireless communication system 400, UE 115 determines whether an HFN desynchronization condition exists or has occurred (e.g., whether an HFN synchronization failure has occurred) in a DRB of the current Ethernet PDU session between UE 115 and base station 105. For example, an HFN desynchronization may occur per DRB, and an Ethernet PDU session may include multiple DRB. In some cases, HFN desynchronization may occur in a subset of the multiple DRBs (e.g., may occur in some DRBs but not on others) of the Ethernet PDU session, and in some cases HFN desynchronization may occur in all the DRBs of the Ethernet PDU session. In these cases, HFN resynchronization in accordance with aspects of the present disclosure may be performed for the DRBs of the Ethernet PDU session suffering an HFN desynchronization condition, and not for the DRBs of the Ethernet PDU session that are not suffering an HFN desynchronization condition.

In aspects, UE 115 may determine whether an HFN desynchronization condition exists by performing Ethernet frame validation on Ethernet frame 470. Ethernet frame validation may include determining whether the Ethernet frame is corrupted or not. For example, UE 115 may determine that an HFN desynchronization condition exists based on a determination that Ethernet frame 470 is corrupted, as a corrupted Ethernet frame 470 may indicate that the deciphering of Ethernet frame 470 as received from base station 105 has failed. In this manner, an HFN desynchronization condition may occur, or put another way, an HFN synchronization failure may occur, when a current HFN at UE 115 and a current HFN at base station 105 are not synchronized to each other.

In aspects, the Ethernet frame validation performed by UE 115 may include determining the size of Ethernet frame 470, and determining whether the size of Ethernet frame 470 is at least a number of octets equal to the sum of the size of the destination address field, the size of the source address field, and the size Length/Type field. For example, where Ethernet frame 470 is configured to have a size of the destination address field equal to 6 octets, a size of the source address field equal to 6 octets, and a size of the Length/Type field equal to 2 octets, UE 115 may perform Ethernet frame validation by determining whether the size of Ethernet frame 470 is at least 6+6+2=14 octets. As a number less than 14 octets may indicate that Ethernet frame is missing a complete destination address field, a complete source address field, and/or a complete size Length/Type field, UE 115 may determine that Ethernet frame 470 is corrupted when UE 115 determines that the size of Ethernet frame 470 is less than the above sum. In this case, UE 115 may determine that Ethernet frame 470 is corrupted and that an HFN synchronization failure has occurred. However, when UE 115 determines that the size of Ethernet frame 470 is at least the above sum (e.g., the sum of the size of the destination address field, the size of the source address field, and the size Length/Type field), UE 115 may continue to perform Ethernet frame validation as described in the following.

In aspects, the Ethernet frame validation performed by UE 115 may include determining whether any VLAN tags are present in the header of Ethernet frame 470, and subtracting, from the size of Ethernet frame 470, the size of the source MAC address and the destination MAC address fields and the size of any VLAN tags present in the header of Ethernet frame 470. The Ethernet frame validation includes determining whether the result of the subtraction is at least equal to the size of the Length/Type field. In this manner, the Ethernet frame validation process may skip the destination address field, the source address field, and any VLAN tags present in the Ethernet frame header, and may determine whether there are any octets remaining, which may correspond to the Length/Type field (e.g., the Length/Type field associated with the Ethernet payload). In this case, when UE 115 determines that the remaining number of octets (e.g., after subtracting the address fields and any VLAN tags) is less than the size of the Length/Type field (e.g., 2 octets), UE 115 may determine Ethernet frame 470 is corrupted (as no Length/Type field is present) and that an HFN synchronization failure has occurred. However, when UE 115 determines that the remaining number of octets (e.g., after subtracting the address fields and any VLAN tags) is at least equal to the size of the Length/Type field (e.g., 2 octets), UE 115 may continue to perform Ethernet frame validation as described in the following.

In aspects, when the value indicated in the Length/Type field of the header of Ethernet frame 470 is not greater than a predetermined threshold (e.g., 1500 octets), the Ethernet frame validation performed by UE 115 may include determining whether the Ethernet frame is corrupted or not based on a comparison of the value indicated in the Length/Type field of the header of Ethernet frame 470 to an Ethernet frame length indicated by a layer 2 (L2) layer. In particular, the Length/Type field of the header of Ethernet frame 470 may be verified against the L2 Ethernet frame length indication to determine whether Ethernet frame 470 may be corrupted. For example, the L2 Ethernet frame length indication may be indicated by a length field in the header or subheader of the PDCP layer, RLC layer, MAC layer, etc. (e.g., any sublayer in L2 layer) PDU associated with the Ethernet frame 470. A delta length may be obtained by subtracting the value indicated in the Length/Type field of the header of Ethernet frame 470 (which may indicate the length of the Ethernet payload of Ethernet frame 470) from the L2 Ethernet frame length indicated by the L2 layer header or subheader. The delta length may then be compared to the length of the header of Ethernet frame 470. For example, the length of the header of Ethernet frame 470 may include the length of the destination address field, the length of the source address field, the length of the Length/Type filed, and the length of any VLAN tags present in the Ethernet header. In response to a determination that delta length is equal to the length of the header of Ethernet frame 470, UE 115 may determine that Ethernet frame 470 is not corrupted, and that an HFN synchronization failure has not occurred. However, in response to a determination that delta length is not equal to the length of the header of Ethernet frame 470, UE 115 may determine that Ethernet frame 470 is corrupted and that an HFN synchronization failure has occurred.

In aspects, when the value indicated in the Length/Type field of the header of Ethernet frame 470 is greater than a predetermined threshold (e.g., 1500 octets), the Ethernet frame validation performed by UE 115 may include comparing the Length/Type field value to preconfigured Ethertype values, when the Ethertype represented by the Length/Type field value is a non-IP Ethertype. For example, in these aspects, UE 115 may determine whether the Length/Type field value indicates that the Ethernet payload of Ethernet frame 470 is of an Ethertype including an IP Ethertype (e.g., IPv4, IPv6, etc.). When the Length/Type field value indicates that the Ethernet payload of Ethernet frame 470 is of IP Ethertype, UE 115 may apply legacy IP packet validation in order to determine whether the IP header carried in the payload of the Ethernet frame 470 is corrupted or not. In this case, if the IP header is determined to be corrupted, Ethernet frame 470 may be determined to be corrupted. However, when the Length/Type field value indicates that the Ethernet payload of Ethernet frame 470 is not an IP header, UE 115 may determine whether the Length/Type field value is in a preconfigured range of allowed Ethertypes. When the Length/Type field value is determined to be in the preconfigured range of allowed Ethertypes, UE 115 UE 115 may determine that Ethernet frame 470 is not corrupted, and that an HFN synchronization failure has not occurred. However, in response to a determination that the Length/Type field value is not in the preconfigured range of allowed Ethertypes, UE 115 may determine that Ethernet frame 470 is corrupted and that an HFN synchronization failure has occurred.

In aspects implementing EHC, Ethernet frame may represent a compressed header packet. In this case, as described above, Ethernet frame 470 may include a CID associated with an EHC context. In these aspects, the Ethernet frame validation performed by UE 115 may include determining, after the compressed header Ethernet frame 470 has been deciphered, whether the CID indicated in the compressed header is a valid CID. A valid CID may refer to a CID in a list of CIDs maintained by UE 115 for which UE 115 has transmitted an EHC feedback to base station 105 indicating that an EHC context has been established for the those CIDs. In this manner, the list of CIDs maintained by UE 115 may represent CIDs that are active and/or valid from UE 115's perspective. In these aspects, UE 115 may determine that Ethernet frame 470 is corrupted when the CID indicated in the compressed header of Ethernet frame 470 is not a valid CID (e.g., is not in the list of valid CDs maintained by UE 115). In this case, UE 115 may determine that an HFN synchronization failure has occurred. UE 115 may determine that Ethernet frame 470 is not corrupted when the CID indicated in the compressed header of Ethernet frame 470 is a valid CID (e.g., is in the list of valid CIDs maintained by UE 115). In this case, UE 115 may determine that an HFN synchronization failure has not occurred.

During operations of wireless communication system 400, UE 115 performs an HFN resynchronization procedure to synchronize the current HFN at UE 115 to the current HFN at base station 105 in response to a determination that an HFN desynchronization condition exists (e.g., in response to a determination that an HFN synchronization failure has occurred).

In aspects, performing the HFN resynchronization procedure may include transmitting an indication (e.g., resynchronization message 474 to base station 105) that an HFN synchronization failure has occurred. In some aspects, base station 105 may take steps to synchronize the HFN value at base station 105 to the HFN value at UE 115. For example, the indication that an HFN synchronization failure has occurred may include an indication of the current HFN value at UE 115. It is noted that, in aspects where the base station performs the Ethernet frame validation procedure and determines that an HFN synchronization failure between UE 115 and base station 105 has occurred, base station may transmit the HFN synchronization failure indication (e.g., resynchronization message 472) to UE 115, and UE may perform an HFN resynchronization procedure in response to receiving the HFN synchronization failure indication. In aspects, performing the HFN resynchronization procedure may include triggering an RRC connection re-establishment procedure between UE 115 and base station 105.

In some aspects, performing the HFN resynchronization procedure may include deciphering Ethernet frame 470 using different HFN values to determine an HFN value that results in a uncorrupted Ethernet frame. For example, UE 115 may increment and/or decrement the current HFN value to obtain a modified HFN value (e.g., current HFN−1, current HFN−2, current HFN+1, current HFN+2, etc.). UE 115 may then decipher Ethernet frame 470 using the modified HFN value, and may perform Ethernet frame validation (e.g., in accordance with aspects described herein) on the deciphered Ethernet frame. If the Ethernet frame deciphered using the modified HFN value is determined to be uncorrupted, UE 115 may update the current HFN value at UE 115 to be equal to the modified HFN value that resulted in an uncorrupted Ethernet frame. However, if the Ethernet frame deciphered using the modified HFN value is determined to also be corrupted, UE 115 may modify the HFN value to obtain a different modified HFN value. UE 115 may decipher Ethernet frame 470 using the different modified HFN value, and may perform validation to determine if the different modified HFN value results in an uncorrupted Ethernet frame or not. UE 115 may perform this process until an HFN value is found that results in an uncorrupted Ethernet frame, at which point UE 115 may update the current HFN value at UE 115 to be equal to the HFN value that results in an uncorrupted Ethernet frame. In this manner, UE 115 may determine resynchronize the current HFN value to a value at base station 105.

It is noted that, in aspects implementing EHC, UE 115 may look for an HFN value that results in a valid CID, at which point UE 115 may update the current HFN value at UE 115 to be equal to the HFN value that results in a valid CID.

Figure 5:
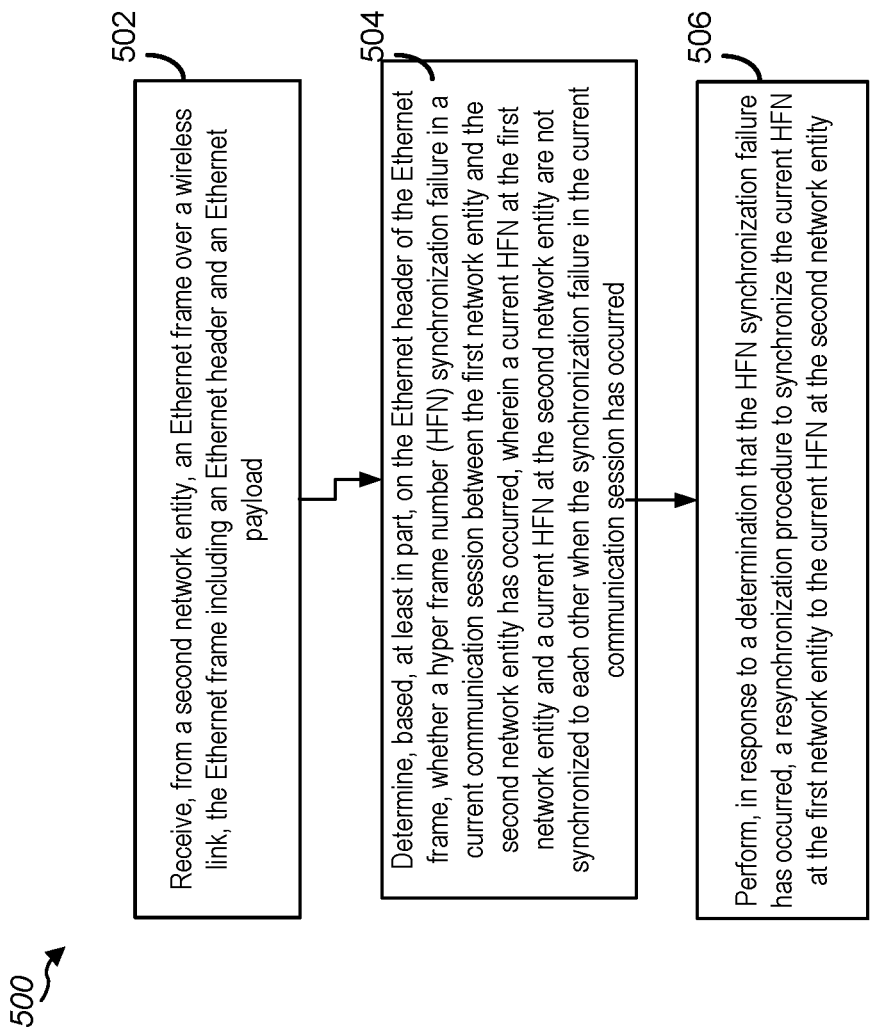
FIG. 5 is a flow diagram illustrating an example process that supports mechanisms for identifying HFN desynchronization conditions and/or for triggering HFN resynchronization in a wireless communication system according to one or more aspects.

FIG. 5 is a flow diagram illustrating an example process 500 that provides mechanisms for identifying HFN desynchronization conditions and/or for triggering HFN resynchronization in a wireless communication system according to one or more aspects. Operations of process 500 may be performed by a first network entity.

Figure 6:
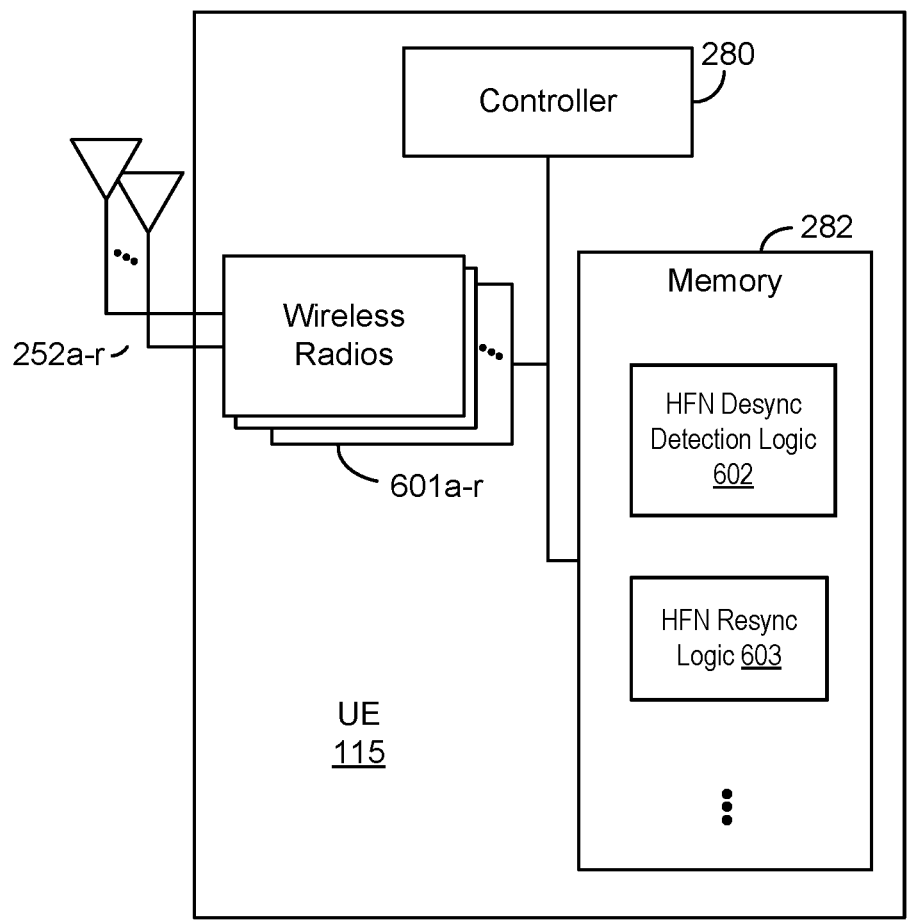
FIG. 6 is a block diagram of an example UE that supports mechanisms for identifying HFN desynchronization conditions and/or for triggering HFN resynchronization in a wireless communication system according to one or more aspects.

In aspects, the first network entity may be a UE, such as UE 115 described above with reference to FIGS. 1-4, and with reference to FIG. 6. In these aspects, example operations (also referred to as "blocks") of process 500 may enable UE 115 to support mechanisms for identifying HFN desynchronization conditions and/or for triggering HFN resynchronization. FIG. 6 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r includes various components and hardware, as illustrated in FIG. 2, including modulator/demodulators 254a-r, MIMO detector 256, receive processor 258, transmit processor 264, and TX MIMO processor 266.

Figure 7:
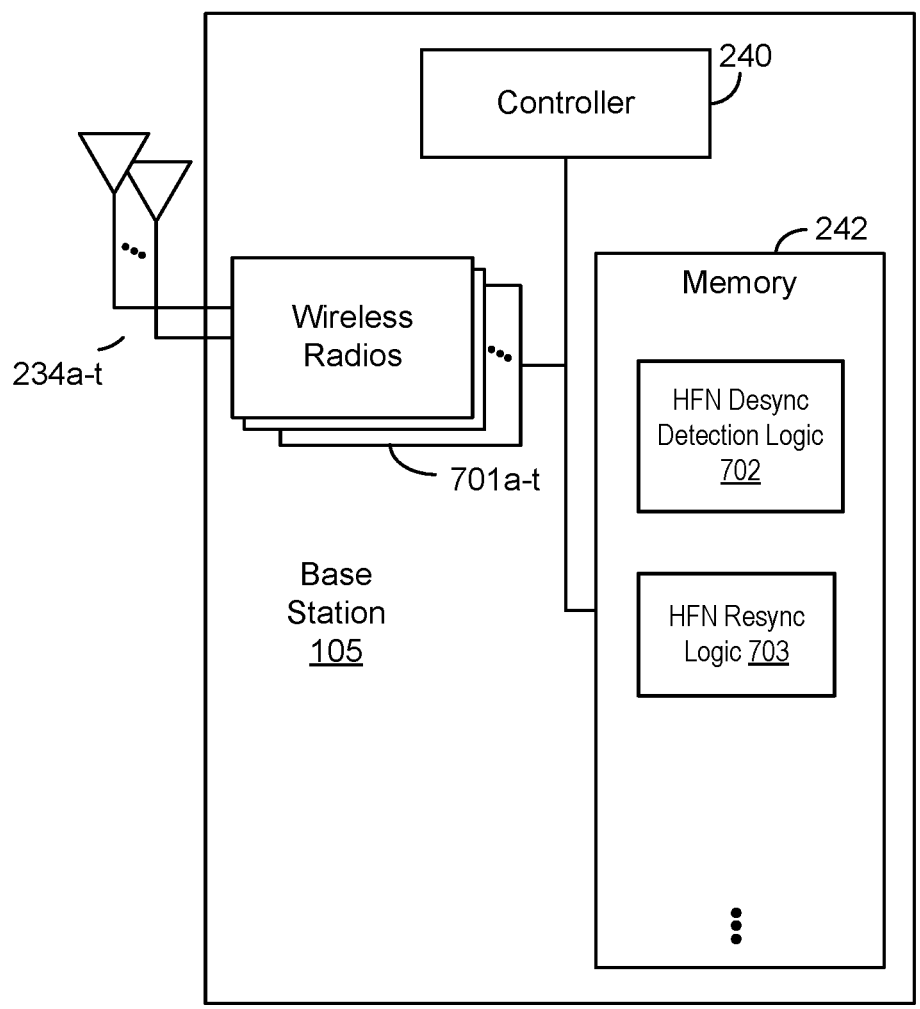
FIG. 7 is a block diagram of an example base station that supports mechanisms for identifying HFN desynchronization conditions and/or for triggering HFN resynchronization in a wireless communication system according to one or more aspects.

In aspects, the first network entity may be a base station, such as base station 105 described above with reference to FIGS. 1-4, or described with reference to FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701a-t and antennas 234a-t. Wireless radios 701a-t includes various components and hardware, as illustrated in FIG. 2 for base station 105, including modulator/demodulators 232a-t, MIMO detector 236, receive processor 238, transmit processor 220, and TX MIMO processor 230.

At block 502 of process 500, a first network entity (e.g., UE 115 or base station 105) receives, from a second network entity, an Ethernet frame over a wireless link, the Ethernet frame including an Ethernet header and an Ethernet payload. For example, in aspects where the first network entity is UE 115 and the second network is base station 105, in order to implement the functionality for such operations, UE 115, under control of controller/processor 280, may receive, from base station 105, an Ethernet frame over a wireless link via wireless radios 601a-r and antennas 252a-r. In aspects, UE 115 may perform operations to receive an Ethernet frame over a wireless link according to operations and functionality as described above with reference to UE 115 and as illustrated in FIGS. 3A-3C and 4.

In aspects where the first network entity is base station 105 and the second network is UE 115, in order to implement the functionality for operations to receive an Ethernet frame over a wireless link from a second network entity, base station 105, under control of controller/processor 240, receives, from UE 115, an Ethernet frame over a wireless link via wireless radios 701a-r and antennas 234a-t. In aspects, base station 105 may perform operations to receive an Ethernet frame over a wireless link according to operations and functionality as described above with reference to base station 105 and as illustrated in FIGS. 3A-3C and 4.

At block 504 of process 500, the first network entity determines, based, at least in part, on the Ethernet header of the Ethernet frame, whether an HFN synchronization failure in a current communication session between the first network entity and the second network entity has occurred. In aspects, a current HFN at the first network entity and a current HFN at the second network entity are not synchronized to each other when the synchronization failure in the current communication session has occurred.

In aspects where the first network entity is UE 115 and the second network is base station 105, in order to implement the functionality for operations to determine whether an HFN synchronization failure in a current communication session between the first network entity and the second network entity has occurred, UE 115, under control of controller/processor 280, executes HFN desynchronization detection logic 602, stored in memory 282. The functionality implemented through the execution environment of HFN desynchronization detection logic 602 allows for UE 115 to perform operations to determine whether an HFN synchronization failure in a current communication session between the first network entity and the second network entity has occurred according to the various aspects herein. In aspects, UE 115 may perform operations to determine whether an HFN synchronization failure in a current communication session between the first network entity and the second network entity has occurred according to operations and functionality as described above with reference to UE 115 and as illustrated in FIGS. 3A-3C and 4.

In aspects where the first network entity is base station 105 and the second network is UE 115, in order to implement the functionality for operations to determine whether an HFN synchronization failure in a current communication session between the first network entity and the second network entity has occurred, base station 105, under control of controller/processor 240, executes HFN desynchronization detection logic 702, stored in memory 242. The functionality implemented through the execution environment of HFN desynchronization detection logic 702, allows for base station 105 to perform operations for determining whether an HFN synchronization failure in a current communication session between the first network entity and the second network entity has occurred according to the various aspects herein. In aspects, base station 105 may perform operations to determine whether an HFN synchronization failure in a current communication session between the first network entity and the second network entity has occurred according to operations and functionality as described above with reference to base station 105 and as illustrated in FIGS. 3A-3C and 4.

At block 506 of process 500, the first network entity performs, in response to a determination that the HFN synchronization failure has occurred, a resynchronization procedure to synchronize the current HFN at the first network entity to the current HFN at the second network entity.

In aspects where the first network entity is UE 115 and the second network is base station 105, in order to implement the functionality for operations to perform, in response to a determination that the HFN synchronization failure has occurred, a resynchronization procedure to synchronize the current HFN at the first network entity to the current HFN at the second network entity, UE 115, under control of controller/processor 280, executes HFN resynchronization logic 603, stored in memory 282. The functionality implemented through the execution environment of HFN resynchronization logic 603 allows for UE 115 to perform operations to perform, in response to a determination that the HFN synchronization failure has occurred, a resynchronization procedure to synchronize the current HFN at the first network entity to the current HFN at the second network entity according to the various aspects herein. In aspects, UE 115 may perform operations to perform, in response to a determination that the HFN synchronization failure has occurred, a resynchronization procedure to synchronize the current HFN at the first network entity to the current HFN at the second network entity according to operations and functionality as described above with reference to UE 115 and as illustrated in FIGS. 3A-3C and 4.

In aspects where the first network entity is base station 105 and the second network is UE 115, in order to implement the functionality for operations to perform, in response to a determination that the HFN synchronization failure has occurred, a resynchronization procedure to synchronize the current HFN at the first network entity to the current HFN at the second network entity, base station 105, under control of controller/processor 240, executes HFN resynchronization logic 703, stored in memory 242. The functionality implemented through the execution environment of HFN resynchronization logic 703, allows for base station 105 to perform operations for performing, in response to a determination that the HFN synchronization failure has occurred, a resynchronization procedure to synchronize the current HFN at the first network entity to the current HFN at the second network entity according to the various aspects herein. In aspects, base station 105 may perform operations to perform, in response to a determination that the HFN synchronization failure has occurred, a resynchronization procedure to synchronize the current HFN at the first network entity to the current HFN at the second network entity according to operations and functionality as described above with reference to base station 105 and as illustrated in FIGS. 3A-3C and 4.

In one or more aspects, techniques for supporting mechanisms for identifying HFN desynchronization conditions and/or for triggering HFN resynchronization in a wireless communication system according to one or more aspects may include additional aspects, such as any single aspect or any combination of aspects described below or in connection with one or more other processes or devices described elsewhere herein. In a first aspect, supporting mechanisms for identifying HFN desynchronization conditions and/or for triggering HFN resynchronization in a wireless communication system may include an apparatus (e.g., a first network entity) configured to receive, from a second network entity, an Ethernet frame over a wireless link, the Ethernet frame including an Ethernet header and an Ethernet payload. The apparatus is further configured to determine, based, at least in part, on the Ethernet header of the Ethernet frame, whether an HFN synchronization failure in a current communication session between the first network entity and the second network entity has occurred. In aspects, a current HFN at the first network entity and a current HFN at the second network entity are not synchronized to each other when the synchronization failure in the current communication session has occurred. The apparatus is further configured to perform, in response to a determination that the HFN synchronization failure has occurred, a resynchronization procedure to synchronize the current HFN at the first network entity to the current HFN at the second network entity. Additionally, the apparatus may perform or operate according to one or more aspects as described below. In some implementations, the apparatus includes a wireless device, such as a UE (e.g., UE 115 as described above) or a base station (e.g., base station 105 as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, performing the resynchronization procedure includes triggering, in response to detecting the HFN desynchronization condition, a connection re-establishment procedure with the second network entity.

In a third aspect, alone or in combination with the second aspect, performing the resynchronization procedure includes foregoing transferring, in response to detecting the HFN desynchronization condition, the Ethernet frame to an application layer of the first network entity.

In a fourth aspect, alone or in combination with one or more of the first aspect through the third aspect, determining that an HFN synchronization failure has occurred includes determining, based, at least in part, on the Ethernet header of the Ethernet frame, whether the Ethernet frame is corrupted.

In a fifth aspect, alone or in combination with the fourth aspect, determining that an HFN synchronization failure has occurred includes determining that the HFN synchronization failure has occurred in response to a determination that the Ethernet frame is corrupted.

In a sixth aspect, alone or in combination with one or more of the first aspect through the fifth aspect, the Ethernet header of the Ethernet frame is configured to include one or more of a destination address field, a source address field, one or more VLAN tags, or a length field associated with the Ethernet payload of the Ethernet frame.

In a seventh aspect, alone or in combination with one or more of the first aspect through the sixth aspect, determining whether the Ethernet frame is corrupted includes determining whether the Ethernet frame includes less than a predetermined minimum number of octets.

In an eighth aspect, alone or in combination with the seventh aspect, determining whether the Ethernet frame is corrupted includes determining, in response to a determination that the Ethernet frame includes less than the predetermined minimum number of octets, that the Ethernet frame is corrupted.

In a ninth aspect, alone or in combination with one or more of the first aspect through the eighth aspect, determining whether the Ethernet frame is corrupted includes subtracting, from a number of octets of the Ethernet frame, a number of octets of the destination address field, a number of octets of the source address field, and a number of octets of the one or more VLAN tags when the Ethernet header of the Ethernet frame includes the one or more VLAN tags to obtain a number of remaining octets, the number of remaining octets corresponding to a length of the Ethernet payload of the Ethernet frame and the Ethernet payload.

In a tenth aspect, alone or in combination with the ninth aspect, determining whether the Ethernet frame is corrupted includes determining that the Ethernet frame is corrupted when the number of remaining octets is less than two octets.

In an eleventh aspect, alone or in combination with one or more of the first aspect through the tenth aspect, the length field associated with the Ethernet payload indicates a length of the Ethernet payload that is less than or equal to a predetermined length threshold.

In a twelfth aspect, alone or in combination with the eleventh aspect, determining whether the Ethernet frame is corrupted includes subtracting the length of the Ethernet payload indicated in the length field associated with the Ethernet payload from a length of the Ethernet frame to obtain a delta length, the Ethernet frame length indicated by one or more of a PDCP layer, an RLC layer, or a MAC layer.

In a thirteenth aspect, alone or in combination with one or more of the eleventh aspect through the twelfth aspect, determining whether the Ethernet frame is corrupted includes determining that the Ethernet frame is corrupted when the delta length is different from a size of the Ethernet header of the Ethernet frame including the one or more VLAN tags.

In a fourteenth aspect, alone or in combination with one or more of the eleventh aspect through the thirteenth aspect, determining whether the Ethernet frame is corrupted includes determining that the Ethernet frame is not corrupted when the delta length is equal to the size of the Ethernet header of the Ethernet frame.

In a fifteenth aspect, alone or in combination with one or more of the first aspect through the fourteenth aspect, the length field associated with the Ethernet payload indicates a length of the Ethernet payload that is greater than a predetermined length threshold and the length of the Ethernet payload indicates an Ethertype of the Ethernet frame.

In a sixteenth aspect, alone or in combination with the fifteenth aspect, determining whether the Ethernet frame is corrupted includes determining whether the Ethertype of the Ethernet frame indicated by the length field associated with the Ethernet payload includes one of IPv4 or IPv6.

In a seventeenth aspect, alone or in combination with one or more of the fifteenth aspect through the sixteenth aspect, determining whether the Ethernet frame is corrupted includes determining whether the Ethertype indicated in the length field associated with the Ethernet payload is included in a preconfigured range, the range indicating a range of allowed Ethertypes, in response to a determination that the Ethertype indicated by the length field associated with the Ethernet payload does not include one of IPv4 or IPv6.

In an eighteenth aspect, alone or in combination with one or more of the fifteenth aspect through the seventeenth aspect, determining whether the Ethernet frame is corrupted includes determining that the Ethernet frame is not corrupted when the Ethertype indicated in the length field associated with the Ethernet payload is included in the preconfigured range, in response to a determination that the Ethertype indicated by the length field associated with the Ethernet payload does not include one of IPv4 or IPv6.

In a nineteenth aspect, alone or in combination with one or more of the fifteenth aspect through the eighteenth aspect, determining whether the Ethernet frame is corrupted includes determining that the Ethernet frame is corrupted when the Ethertype indicated in the length field associated with the Ethernet payload is not included in the preconfigured range, in response to a determination that the Ethertype indicated by the length field associated with the Ethernet payload does not include one of IPv4 or IPv6.

In a twentieth aspect, alone or in combination with one or more of the fifteenth aspect through the nineteenth aspect, determining whether the Ethernet frame is corrupted includes determining whether an IP header of the Ethernet is corrupted, in response to a determination that the Ethertype indicated by the length field associated with the Ethernet payload includes one of IPv4 or IPv6.

In a twenty-first aspect, alone or in combination with one or more of the fifteenth aspect through the twentieth aspect, determining whether the Ethernet frame is corrupted includes determining that the Ethernet frame is corrupted in response to a determination that the IP header of the Ethernet frame is corrupted, in response to a determination that the Ethertype indicated by the length field associated with the Ethernet payload includes one of IPv4 or IPv6.

In a twenty-second aspect, alone or in combination with one or more of the first aspect through the twenty-first aspect, the Ethernet header of the Ethernet frame is a compressed header including a compression CID associated with the Ethernet header.

In a twenty-third aspect, alone or in combination with one or more of the first aspect through the twenty-second aspect, determining whether an HFN synchronization failure has occurred includes obtaining the CID associated with the Ethernet header.

In a twenty-fourth aspect, alone or in combination with the twenty-third aspect, determining whether an HFN synchronization failure has occurred includes determining whether the obtained CID is a valid CID.

In a twenty-fifth aspect, alone or in combination with one or more of the twenty-third aspect through the twenty-fourth aspect, determining whether an HFN synchronization failure has occurred includes determining that an HFN synchronization failure has occurred when the obtained CID is not a valid CID.

In a twenty-sixth aspect, alone or in combination with one or more of the first aspect through the twenty-fifth aspect, the techniques of the first aspect include determining that an HFN synchronization failure has not occurred when the obtained CID is a valid CID.

In a twenty-seventh aspect, alone or in combination with one or more of the first aspect through the twenty-sixth aspect, determining whether the obtained CID is a valid CID includes determining whether the obtained CID is included in a list of currently valid CIDs maintained by the first network entity.

In a twenty-eighth aspect, alone or in combination with one or more of the first aspect through the twenty-seventh aspect, performing the resynchronization procedure to synchronize the current HFN at the first network entity and the current HFN at the second network entity includes modifying the current HFN at the first network entity by one or more offset values to obtain a set of modified HFN values.

In a twenty-ninth aspect, alone or in combination with the twenty-eighth aspect, performing the resynchronization procedure to synchronize the current HFN at the first network entity and the current HFN at the second network entity includes deciphering the received Ethernet header using each of the set of modified HFN values successively.

In a thirtieth aspect, alone or in combination with one or more of the twenty-eighth aspect through the twenty-ninth aspect, performing the resynchronization procedure to synchronize the current HFN at the first network entity and the current HFN at the second network entity includes determining that an Ethernet header obtained by deciphering the received Ethernet header using a respective HFN value of the set of modified HFN values is uncorrupted.

In a thirty-first aspect, alone or in combination with one or more of the twenty-eighth aspect through the thirtieth aspect, performing the resynchronization procedure to synchronize the current HFN at the first network entity and the current HFN at the second network entity includes updating the current HFN at the first network entity to be equal to the respective HFN used to decipher the received Ethernet header from which the uncorrupted Ethernet header is obtained.

In a thirty-second aspect, alone or in combination with one or more of the first aspect through the thirty-first aspect, the one or more offset values includes one or more of a positive offset, or a negative offset.

In a thirty-third aspect, alone or in combination with one or more of the first aspect through the thirty-second aspect, performing the resynchronization procedure includes transmitting, to the second network entity, an indication that an HFN synchronization failure has occurred.

In a thirty-fourth aspect, alone or in combination with one or more of the first aspect through the thirty-third aspect, the first network entity is a UE and the second network entity is a base station, the e first network entity is a base station and the second network entity is a UE, or the first network entity is a UE and the second network entity is another UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, software, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. As used herein, the term "or" is intended to be inclusive when used in a series and may be used interchangeably with "and/or," unless explicitly stated otherwise (e.g., if used in combination with "either" or "only one of"). Further, the phrase "based on" is intended to mean "based, at least in part, on" unless explicitly stated otherwise. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a first network entity, the method comprising:
receiving, from a second network entity, an Ethernet frame over a wireless link, the Ethernet frame including an Ethernet header and an Ethernet payload;
determining, based, at least in part, on the Ethernet header of the Ethernet frame, whether a hyper frame number (HFN) synchronization failure in a current communication session between the first network entity and the second network entity has occurred, wherein a current HFN at the first network entity and a current HFN at the second network entity are not synchronized to each other when the HFN synchronization failure in the current communication session has occurred; and
performing, in response to a determination that the HFN synchronization failure has occurred, a resynchronization procedure to synchronize the current HFN at the first network entity to the current HFN at the second network entity.

2. The method of claim 1, wherein performing the resynchronization procedure includes one or more of:
triggering, in response to determining that the HFN synchronization failure has occurred, a connection re-establishment procedure with the second network entity; or
foregoing transferring, in response to determining that the HFN synchronization failure has occurred, the Ethernet frame to an application layer of the first network entity.

3. The method of claim 1, wherein determining that an HFN synchronization failure has occurred includes:
determining, based, at least in part, on the Ethernet header of the Ethernet frame, whether the Ethernet frame is corrupted; and
determining that the HFN synchronization failure has occurred in response to a determination that the Ethernet frame is corrupted.

4. The method of claim 3, wherein the Ethernet header of the Ethernet frame is configured to include one or more of:
a destination address field;
a source address field;
one or more virtual local area network (VLAN) tags; or
a length field associated with the Ethernet payload of the Ethernet frame.

5. The method of claim 4, wherein determining whether the Ethernet frame is corrupted includes:
determining whether the Ethernet frame includes less than a predetermined minimum number of octets; and
determining, in response to a determination that the Ethernet frame includes less than the predetermined minimum number of octets, that the Ethernet frame is corrupted.

6. The method of claim 4, wherein determining whether the Ethernet frame is corrupted includes:
subtracting, from a number of octets of the Ethernet frame, a number of octets of the destination address field, a number of octets of the source address field, and a number of octets of the one or more VLAN tags when the Ethernet header of the Ethernet frame includes the one or more VLAN tags to obtain a number of remaining octets, the number of remaining octets corresponding to a length of the Ethernet payload of the Ethernet frame and the Ethernet payload; and
determining that the Ethernet frame is corrupted when the number of remaining octets is less than two octets.

7. The method of claim 4, wherein the length field associated with the Ethernet payload indicates a length of the Ethernet payload that is less than or equal to a predetermined length threshold, and wherein determining whether the Ethernet frame is corrupted includes:
subtracting the length of the Ethernet payload indicated in the length field associated with the Ethernet payload from a length of the Ethernet frame to obtain a delta length, the length of the Ethernet frame indicated by one or more of a packet data convergence protocol (PDCP) layer, a radio link control (RLC) layer, or a medium access control (MAC) layer;
determining that the Ethernet frame is corrupted when the delta length is different from a size of the Ethernet header of the Ethernet frame including the one or more VLAN tags; and
determining that the Ethernet frame is not corrupted when the delta length is equal to the size of the Ethernet header of the Ethernet frame.

8. The method of claim 4, wherein the length field associated with the Ethernet payload indicates a length of the Ethernet payload that is greater than a predetermined length threshold and the length of the Ethernet payload indicates an Ethertype of the Ethernet frame, and wherein determining whether the Ethernet frame is corrupted includes:
determining whether the Ethertype of the Ethernet frame indicated by the length field associated with the Ethernet payload includes one of internet protocol version 4 (IPv4) or internet protocol version 6 (IPv6);
in response to a determination that the Ethertype indicated by the length field associated with the Ethernet payload does not include one of IPv4 or IPv6:
determining whether the Ethertype indicated in the length field associated with the Ethernet payload is included in a preconfigured range, the preconfigured range indicating a range of allowed Ethertypes;
determining that the Ethernet frame is not corrupted when the Ethertype indicated in the length field associated with the Ethernet payload is included in the preconfigured range; and
determining that the Ethernet frame is corrupted when the Ethertype indicated in the length field associated with the Ethernet payload is not included in the preconfigured range; and
in response to a determination that the Ethertype indicated by the length field associated with the Ethernet payload includes one of IPv4 or IPv6:
determining whether an internet protocol (IP) header of the Ethernet frame is corrupted; and
determining that the Ethernet frame is corrupted in response to a determination that the IP header of the Ethernet frame is corrupted.

9. The method of claim 1, wherein the Ethernet header of the Ethernet frame is a compressed header including a compression context ID (CID) associated with the Ethernet header.

10. The method of claim 9, wherein determining whether an HFN synchronization failure has occurred includes:
obtaining the CID associated with the Ethernet header;
determining whether the obtained CID associated with the Ethernet header is a valid CID; and
determining that an HFN synchronization failure has occurred when the obtained CID associated with the Ethernet header is not a valid CID.

11. The method of claim 10, further comprising:
determining that an HFN synchronization failure has not occurred when the obtained CID associated with the Ethernet header is a valid CID.

12. The method of claim 10, wherein determining whether the obtained CID associated with the Ethernet header is a valid CID includes determining whether the obtained CID associated with the Ethernet header is included in a list of currently valid CIDs maintained by the first network entity.

13. The method of claim 1, wherein performing the resynchronization procedure to synchronize the current HFN at the first network entity and the current HFN at the second network entity includes:
modifying the current HFN at the first network entity by one or more offset values to obtain a set of modified HFN values;
deciphering the Ethernet header of the received Ethernet frame using each of the set of modified HFN values successively;
determining that an Ethernet header obtained by deciphering the Ethernet header of the received Ethernet frame using a respective HFN value of the set of modified HFN values is uncorrupted; and
updating the current HFN at the first network entity to be equal to the respective HFN used to decipher the Ethernet header of the received Ethernet frame from which the Ethernet header determined to be uncorrupted is obtained.

14. The method of claim 13, wherein the one or more offset values includes one or more of:
a positive offset; or
a negative offset.

15. The method of claim 1, wherein performing the resynchronization procedure includes:
transmitting, to the second network entity, an indication that an HFN synchronization failure has occurred.

16. The method of claim 1, wherein one of:
the first network entity is a user equipment (UE) and the second network entity is a base station;
the first network entity is a base station and the second network entity is a UE; or
the first network entity is a UE and the second network entity is another UE.

17. An apparatus configured for wireless communication, the apparatus comprising:
at least one processor; and
a memory coupled to the at least one processor, the memory storing processor-readable code that, when executed by the at least one processor, causes the apparatus to perform operations including:
receiving, by a first network entity from a second network entity, an Ethernet frame over a wireless link, the Ethernet frame including an Ethernet header and an Ethernet payload;
determining, based, at least in part, on the Ethernet header of the Ethernet frame, whether a hyper frame number (HFN) synchronization failure in a current communication session between the first network entity and the second network entity has occurred, wherein a current HFN at the first network entity and a current HFN at the second network entity are not synchronized to each other when the HFN synchronization failure in the current communication session has occurred; and
performing, in response to a determination that the HFN synchronization failure has occurred, a resynchronization procedure to synchronize the current HFN at the first network entity to the current HFN at the second network entity.

18. The apparatus of claim 17, wherein performing the resynchronization procedure includes one or more of:
triggering, in response to determining that the HFN synchronization failure has occurred, a connection re-establishment procedure with the second network entity; or
foregoing transferring, in response to determining that the HFN synchronization failure has occurred, the Ethernet frame to an application layer of the first network entity.

19. The apparatus of claim 17, wherein determining that an HFN synchronization failure has occurred includes:
determining, based, at least in part, on the Ethernet header of the Ethernet frame, whether the Ethernet frame is corrupted; and
determining that the HFN synchronization failure has occurred in response to a determination that the Ethernet frame is corrupted.

20. The apparatus of claim 19, wherein the Ethernet header of the Ethernet frame is configured to include one or more of:
a destination address field;
a source address field;
one or more virtual local area network (VLAN) tags; or
a length field associated with the Ethernet payload of the Ethernet frame.

21. The apparatus of claim 20, wherein determining whether the Ethernet frame is corrupted includes:
determining whether the Ethernet frame includes less than a predetermined minimum number of octets; and
determining, in response to a determination that the Ethernet frame includes less than the predetermined minimum number of octets, that the Ethernet frame is corrupted.

22. The apparatus of claim 20, wherein determining whether the Ethernet frame is corrupted includes:
subtracting, from a number of octets of the Ethernet frame, a number of octets of the destination address field, a number of octets of the source address field, and a number of octets of the one or more VLAN tags when the Ethernet header of the Ethernet frame includes the one or more VLAN tags to obtain a number of remaining octets, the number of remaining octets corresponding to a length of the Ethernet payload of the Ethernet frame and the Ethernet payload; and
determining that the Ethernet frame is corrupted when the number of remaining octets is less than two octets.

23. The apparatus of claim 20, wherein the length field associated with the Ethernet payload indicates a length of the Ethernet payload that is less than or equal to a predetermined length threshold, and wherein determining whether the Ethernet frame is corrupted includes:
subtracting the length of the Ethernet payload indicated in the length field associated with the Ethernet payload from a length of the Ethernet frame to obtain a delta length, the length of the Ethernet frame indicated by one or more of a packet data convergence protocol (PDCP) layer, a radio link control (RLC) layer, or a medium access control (MAC) layer;
determining that the Ethernet frame is corrupted when the delta length is different from a size of the Ethernet header of the Ethernet frame including the one or more VLAN tags; and determining that the Ethernet frame is not corrupted when the delta length is equal to the size of the Ethernet header of the Ethernet frame.

24. The apparatus of claim 20, wherein the length field associated with the Ethernet payload indicates a length of the Ethernet payload that is greater than a predetermined length threshold and the length of the Ethernet payload indicates an Ethertype of the Ethernet frame, and wherein determining whether the Ethernet frame is corrupted includes:
  determining whether the Ethertype of the Ethernet frame indicated by the length field associated with the Ethernet payload includes one of internet protocol version 4 (IPv4) or internet protocol version 6 (IPv6);
  in response to a determination that the Ethertype indicated by the length field associated with the Ethernet payload does not include one of IPv4 or IPv6:
    determining whether the Ethertype indicated in the length field associated with the Ethernet payload is included in a preconfigured range, the preconfigured range indicating a range of allowed Ethertypes;
    determining that the Ethernet frame is not corrupted when the Ethertype indicated in the length field associated with the Ethernet payload is included in the preconfigured range; and
    determining that the Ethernet frame is corrupted when the Ethertype indicated in the length field associated with the Ethernet payload is not included in the preconfigured range; and
  in response to a determination that the Ethertype indicated by the length field associated with the Ethernet payload includes one of IPv4 or IPv6:
    determining whether an internet protocol (IP) header of the Ethernet frame is corrupted; and
    determining that the Ethernet frame is corrupted in response to a determination that the IP header of the Ethernet frame is corrupted.

25. The apparatus of claim 17, wherein the Ethernet header of the Ethernet frame is a compressed header including a compression context ID (CID) associated with the Ethernet header.

26. The apparatus of claim 25, wherein determining whether an HFN synchronization failure has occurred includes:
  obtaining the CID associated with the Ethernet header;
  determining whether the obtained CID is a valid CID; and
  determining that an HFN synchronization failure has occurred when the obtained CID is not a valid CID.

27. The apparatus of claim 26, wherein determining whether the obtained CID associated with the Ethernet header is a valid CID includes determining whether the obtained CID associated with the Ethernet header is included in a list of currently valid CIDs maintained by the first network entity.

28. The apparatus of claim 17, wherein performing the resynchronization procedure to synchronize the current HFN at the first network entity and the current HFN at the second network entity includes:
  modifying the current HFN at the first network entity by one or more offset values to obtain a set of modified HFN values;
  deciphering the received Ethernet header using each of the set of modified HFN values successively;
  determining that an Ethernet header obtained by deciphering the Ethernet header of the received Ethernet frame using a respective HFN value of the set of modified HFN values is uncorrupted; and
  updating the current HFN at the first network entity to be equal to the respective HFN used to decipher the Ethernet header of the received Ethernet frame from which the Ethernet header determined to be uncorrupted is obtained.

29. The apparatus of claim 17, wherein performing the resynchronization procedure includes:
  transmitting, to the second network entity, an indication that an HFN synchronization failure has occurred.

30. The apparatus of claim 17, wherein one of:
  the first network entity is a user equipment (UE) and the second network entity is a base station;
  the first network entity is a base station and the second network entity is a UE; or
  the first network entity is a UE and the second network entity is another UE.

* * * * *